United States Patent [19]
Davis, Sr.

[11] 3,872,655
[45] Mar. 25, 1975

[54] PNEUMATIC TOBACCO HARVESTER

[76] Inventor: William E. Davis, Sr., Rt. 1, Box 32, Seven Springs, N.C. 28578

[22] Filed: Dec. 14, 1972

[21] Appl. No.: 315,001

[52] U.S. Cl............................ 56/27.5, 56/30, 56/330
[51] Int. Cl.............................................. A01d 45/16
[58] Field of Search...... 56/27.5, 30, 32, 35, 328 R, 56/330

[56] References Cited
UNITED STATES PATENTS

| | | | |
|---|---|---|---|
| 2,387,004 | 10/1945 | Berry | 56/30 X |
| 2,702,976 | 3/1955 | Diserens | 56/30 X |
| 3,114,227 | 12/1963 | Morkoski et al. | 56/30 |
| 3,332,220 | 7/1967 | Lofgreen | 56/30 |
| 3,590,566 | 7/1971 | Cutts et al. | 56/330 |
| 3,754,382 | 8/1973 | Rakestraw | 56/27.5 |

Primary Examiner—Louis G. Mancene
Assistant Examiner—J. N. Eskovitz
Attorney, Agent, or Firm—Mills and Coats

[57] ABSTRACT

In abstract, a preferred embodiment of the present invention entails a pneumatic tobacco harvester comprising a mobile frame structure adapted to move through the field, a defoliating unit extending from the frame structure and normally encompassing the stalks of the row being harvested for defoliating leaves from successive stalks passing there through, a pneumatic conveyor system operatively associated with said defoliating unit for receiving the defoliated leaves from the defoliating unit and conveying the leaves therefrom, a leaf separator-conveyor assembly partially disposed within said pneumatic conveyor system for intercepting the tobacco leaves moving within the pneumatic conveyor system and for conveying the intercepted leaves therefrom, and a conveyor means for receiving the separated leaves from the leaf separator assembly and conveying leaves therefrom to a bulk storage facility.

17 Claims, 11 Drawing Figures

PNEUMATIC TOBACCO HARVESTER

The present invention relates to agricultural machinery, and more particularly to a tobacco harvester employing a pneumatic conveying system for transferring tobacco leaves from a defoliating unit to a bulk storage facility.

Although automatic harvesters have been known for sometime, it has only been in recent years that they have begun to gain commercial acceptance. When one speaks of an automatic tobacco harvester, he is referring to the general type that includes a defoliating unit which conventionally straddles a row of stalks and defoliates the leaves from a certain portion thereof as the harvester is propelled through the field. Once the leaves have been defoliated or stripped from the stalk, then they are normally conveyed from the defoliating unit to a bulk storage facility which may be carried by the harvester or pulled there behind.

It is in this general design area, i.e., the conveying system between the defoliating unit and the bulk storage facility, that many of the design problems have been encountered. More particularly, some of the conveying systems presently used between the defoliating unit and the bulk storage facility tend to break, bruise and generally damage the leaf during the conveying operation. The tearing and bruising of the individual leaves being conveyed from the defoliating unit to the bulk storage facility has generally resulted from the type of conveying systems used. The two most common types of conveying systems presently used by automatic tobacco harvesters are: (1) a double belt arrangement where the leaves are conveyed between two belts disposed in side-by-side relationship with the tobacco leaves being retained between the two and conveyed thereby, and (2) a combination of a series of rollers disposed adjacent a single belt wherein the individual leaves are conveyed between the rollers and the single belt.

In addition to the problems of leaf damage associated with the above discussed conveyor systems, it obviously follows that such conveyor systems can be relatively expensive and difficult to maintain because in either system mechanical drives are required and the systems inherently have numerous parts that are susceptible to wear and require maintenance.

After much research and study into the above mentioned problems, the tobacco harvester of the present invention has been devised to provide a system for conveying the tobacco leaves from the defoliating unit of the harvester to the bulk storage facility. In particularly, the tobacco harvester of the present invention utilizes a pneumatic air conveyor system for conveying the leaves in an air stream from the defoliating unit to a central area on the harvester. To separate the individual leaves suspended in the air stream of the pneumatic conveyor system, the present invention utilizes a leaf separator-conveyor assembly in the form of a rotatively mounted cylinder, the cylinder being disposed such that a portion thereof continues to lie in a cross section of said pneumatic air conveyor system. The presence of the leaf separator-conveyor assembly within the pneumatic conveyor system results in the leaves moving therein being intercepted by the wall structure of the cylinder. Because the cylinder is continuously driven it accordingly functions to transfer intercepted leaves from the pneumatic conveyor system to a final conveyor assembly which transfers the leaves to the bulk storage facility.

It is, therefore, an object of the present invention to provide a tobacco harvester having a new and improved system for conveying leaves from a defoliating unit of the harvester.

More particularly, a further object of the present invention resides in the provision of a pneumatic air conveyor system that is generally operatively associated with a defoliating unit of an automatic tobacco harvester wherein the pneumatic air conveyor system functions to convey and transfer the defoliated leaves in an air stream from the defoliating unit, thereby substantially decreasing the potential for damage to the leaves being conveyed on the harvester.

Still a further object of the present invention is to provide a tobacco harvester of the type having an automatic defoliating unit for defoliating leaves of tobacco extending from the stalks of the row being harvested and a bulk storage facility associated with said harvester for receiving the defoliated leaves, and wherein the present invention provides a pneumatic conveyor system for conveying the defoliated leaves from the defoliating unit to an area on said harvester where the leaves suspended in the air stream of the pneumatic system are separated therefrom by a leaf separator-conveyor assembly in the form of a cylindrical drum that continuously has a cylindrical portion thereof disposed interiorly of the pneumatic conveyor system for engaging and intercepting the passing leaves and conveying them therefrom.

Another object of the present invention resides in the provision of an air conveyor system for a tobacco harvester that conveys the individual leaves defoliated by the harvester from a defoliating unit to an area on said harvester, wherein the conveying of the tobacco within the air stream is accomplished quickly and efficiently and possesses the capability for transferring a substantial quantity of tobacco during a given period of time.

A further object of the present invention is to provide a final conveyor assembly that is movable relative to a bulk storage facility, whereby the bulk storage facility may be uniformly filled by periodically changing the position of the final conveyor assembly such that all areas of the bulk storage facility are filled.

Another object of the present invention is to provide a defoliating unit that utilizes a system of forced air to separate leaves above a desired priming level from those leaves of the stalk that are disposed in the desired priming level.

It is also an object of the present invention to provide a leaf defoliating unit that uses a cooperative pneumatic and mechanical system for defoliating leaves from a tobacco stalk.

A more particular object of the present invention is to provide a cooperate pneumatic and mechanical defoliating system wherein the pneumatic system orients the body of the leaves away from the mechanical system such that the mechanical system tends to only engage the inner stem portion of the leaves, thus avoiding repeated and continuous engagement with the more delicate body portion of the leaves.

In addition, a further object of the present invention resides in the provision of a material handling apparatus having a material suction system for continually receiving material and conveying the received material within an air stream from the point of reception, and wherein said material handling apparatus further includes a material separator-conveyor assembly operatively associated with said pneumatic suction system for intercepting and separating the material therein from the air and conveying the intercepted material from the system where the material may be conveniently stored in a bulk storage facility Other objects and advantages of the present invention will become apparent from a study of the following description and the accompanying drawings which are merely illustrative of the present invention.

With further reference to the drawings, a pneumatic tobacco harvester is shown therein and indicated generally at 10. Although the tobacco harvester 10 could be of the self-propelled type, the embodiment shown in the present drawings illustrate a tractor mounted version wherein the basic harvesting components are associated with a conventional farm tractor 11.

First, viewing the tobacco harvester 10 generally, it will be seen that the harvester comprises a defoliating unit or header 12 which basically functions as a material receiving unit which, in the case of harvesting tobacco, acts to defoliate leaves from the stalks of the row being harvested. From the defoliating unit or header 12, the material received thereby is conveyed therefrom by a pneumatic conveyor system, indicated generally at 14. The pneumatic conveyor system 14 generates a stream of air that suspends material therein and conveys the material from the defoliating unit or header 12 to a remote area on the harvester 10.

To separate the material, which is in the form of tobacco leaves in the case of tobacco harvesting, from the air stream of the pneumatic conveyor system, the present invention discloses separating means in the form of a separator-conveyor assembly, indicated generally at 16. The separating means is partially disposed within the pneumatic conveyor system and is provided with openings therein whereby air moving through the pneumatic system may readily pass there though while the material being carried by the air is retained by the separating means. During operation, the separating means 16 is continually driven such that the material within the pneumatic conveyor system retained by said separating means 16 may be continually and readily transferred therefrom.

Continuing to refer to the basic components of the harvester 10, a conveying means, indicated generally at 18, is disposed adjacent the separating means 16 and particularly adapted to receive the material retained thereby. From the conveying means 18, the material separated from the pneumatic conveying system 14 is conveyed to a conventional type of bulk storage facility which in the present disclosure is a trailing wagon 20.

Turning to a detail description of the basic components discussed above, it is seen that the defoliating unit or header 12 basically comprises an inner and outer housing structure, 22 and 24, respectively, disposed in side-by-side relationship and suspended from the side of the tractor by a compound elevating and supporting linkage indicated generally at 26. The compound elevating and supporting linkage 26 is adapted to elevate the defoliating unit to a desired level during the tobacco harvesting operation such that the leaves disposed about a certain level of the stalks will be encompassed and defoliated during the harvesting operation. As will be described subsequently in greater detail, the linkage system 26 is preferably provided with the necessary linkage mechanism to allow it to pivot about both vertical and horizontal axes. Therefore, by being able to move up and down and side-to-side, the linkage system 26 permits the defoliating unit 12 to be readily adjusted to various positions to accommodate various priming levels and various row spacings.

Referring to the detail structure of the defoliating unit or header 12, it is seen that the elevating and supporting linkage 26 maintains the inner and outer housing 22 and 24, respectively, in lateral spaced apart relationship such that the space there between defines a row opening area 28 where the successive stalks of the row being harvested may enter.

Both inner and outer housings 22 and 24 include an upper generally U-shaped leaf divider panel 30. Each leaf divider panel 30 is pivotably mounted about a longitudinal axis to a respective housing. Therefore, it is apparent that each leaf divider panel 30 may be adjusted up or down to increase or decrease the defoliating or priming area of the unit. To maintain the leaf divider panels 30 at a desired setting, an adjustment plate 30c is welded to the front portion of each of the housings adjacent the respective leaf divider panel 30. A wing nut assembly 30e projects through an opening formed in the adjustment plate 30c and is threaded on the divider panel pivot shaft (not shown). Therefore, it is apparent that by loosening the wing nut assembly 30e the associated U-shaped leaf divider panel may be positioned at a desired setting.

Figures 10, 11:
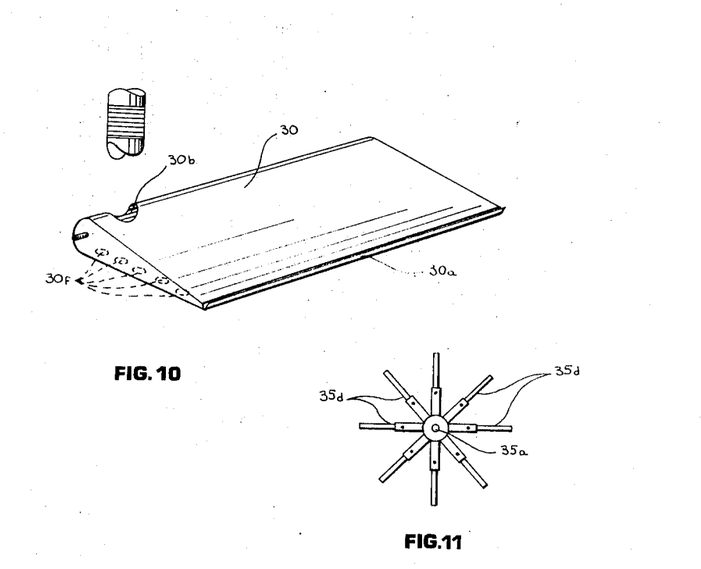
FIG. 10 is a perspective view of the leaf divider panel of the defoliating unit.
FIG. 11 is a front elevational view of the fingers of the defoliating unit.

Viewing the generally U-shaped leaf divider panel 30 in greater detail, it is seen from the drawings that the inner most edge of the lower portion thereof is provided with an upturned lip 30a. Also, it is seen that the curved portion thereof, generally opposite the lip 30a has a cutout 30b formed therein. The front edge of the lower portion of the divider panel 30 includes a series of spaced apart openings or perforations 30f.

As will be described in greater detail subsequently in this disclosure, the defoliating unit 12 utilizes a system of forced air to separate the leaves of the stalk being defoliated from the upper disposed leaves that are being by-passed during the particular harvesting operation. A portion of the forced air used by the defoliating unit 12 is directed into the cutout 30b of each of the leaf divider panels 30. The air directed into each of the cutouts 30b rushes toward the upturned lip 38. As the air passes the upturned lip 38, it is directed generally upwardly therefrom against the underside of the overlying leaves of the tobacco stalk passing through the defoliating unit 12. The presence of the air against the underside of the leaves tends to push the leaves up, clearly separating them from the leaves disposed within the defoliating unit 12. In addition, a portion of the air passing through the generally U-shaped divider panels 30 tends to exit through the openings 30f formed in the lower front portion of the panel. The air exiting through these openings and out the front edge thereof tends to push the upper most leaves entering the defoliating unit down such that they do not unduly engage and slide against the underside of the leaf divider panels 30.

Disposed about the front side of each housing 22 and 24 is a side air blast assembly, indicated generally at 29. In terms of function, the side air blast assembly 29 serves to direct a system of forced air inwardly from each side of the defoliating unit, thereby tending to force the leaves of the stalk that are entering the defoliating unit inwardly, avoiding unnecessary contact with the front portion of the defoliating unit.

Viewing the side air blast assembly 29 in more detail, it is seen from the drawings that the assembly comprises a side plate structure 29 that includes a generally semi-circular inner edge 29b. The side plate structure 29a is joined by a bottom plate 29c and a back plate 29d, all of which are integrally constructed and carried by a respective defoliating unit housing 22 or 24. Positioned about the top of the side air blast assembly 29 is an opening 29e for receiving forced air to be utilized by the assembly.

As generally pointed out herein before, the tobacco leaves or material received by the defoliating unit or header 12 is transferred to a remote area on the harvester 10 by a pneumatic air conveyor system 14. To provide for the passage of air through the defoliating unit 12, there is provided an opening 32a in the outermost side of the outer housing 24. Air entering opening 32a generally tends to sweep inwardly across the defoliating unit, and generally possesses enough force to defoliate some of the leaves of the stalk disposed therein. A vertical opening 32b is provided about the top portion of the inner housing 24 and serves as an air exit area for the air sweeping across the defoliating unit 12.

To assure complete and efficient defoliation, the present defoliating unit 12 is provided with a rearwardly disposed mechanical defoliating system, indicated generally at 35. Referring to the mechanical defoliating system 35 in detail, it is seen that a pair of defoliating shafts 35a are rotatively journaled about the rear of the defoliating unit 12, each defoliating shaft being associated with one side of the defoliating unit and generally oriented at an angle to the row opening 28 formed by the two housings 22 and 24. Each defoliating shaft 35a is rotatively journaled in a bearing 35b that is carried by a vertical adjustable mounting plate 35c. A hydraulic motor 35b is also mounted to each plate 35c and is operative to drive the adjacent defoliating shaft 35a via a chain drive 35f.

Radially extending and axially spaced about the front portion of each defoliating shaft 35a is a series of defoliating fingers 35d. Each defoliating finger preferably includes an outer portion that is telescopically mounted about an inner portion such that the length thereof may be conveniently adjusted in accordance with the position of the leaf divider panels 30. Also, it should be pointed out that the vertical adjustable mounting plate 35c may be readily adjusted to center the defoliating shaft associated therewith in accordance with the particular position of the same U-shaped leaf divider panels 30. In order to assure that the tobacco stalks may pass uninhibited through the defoliating unit 12, the defoliating fingers 35d may be preferably constructed of a generally flexible, elastic material.

Finally the defoliating unit 12 includes a stalk gripping mechanism indicated generally at 37 and particularly disposed about the lower portion of the defoliating unit about the innermost side of each of the housings 22 and 24. Briefly the stalk gripping mechanism 37 includes a pair of v-belts 37a about each side of the defoliating unit, with each belt being trained around a series of rotatively mounted pulleys 37b. The rear most pulleys 37b of the stalk gripping mechanism are driven by a pair of hydraulic motors 37c.

Briefly reviewing the compound elevating and supporting linkage structure 26, it is noted that the defoliating unit 12 is supported by a pair of side supports 26a joined about the top portion thereof by a rectangular frame 26b. Rectangular frame 26b is rotatively mounted to a front swivel shaft 26c which is in turn supported by a main beam 26d. Main beam 26d includes a front yoke 26e pivotably mounted about a horizontal axis to swivel shaft 26c, and the main beam 26d further includes a rear yoke 26g which is mounted for pivotable movement about a horizontal axis and about the vertical axis of a main anchor shaft 26f. Extending between the swivel shaft 26c and the main anchor shaft 26f is a reinforcing rod 26h. Pivotably mounted to the top portion of the swivel shaft 26c and depending generally downwardly therefrom is a lever arm 26i which is operatively attached to the rectangular frame 26b. Connected between the lever arm 26i and the main anchor shaft 26f is a guide rod 26j which functions to maintain the defoliating unit 12 in a parallel relationship with respect to the longitudinal axis of the tractor 11, irrespective of the position of the main beam 26d. For controlling the compound elevating and support linkage 26, various hydraulic cylinders and valves and controls therefor may be utilized to automatically power the linkage. Details of the hydraulic systems and controls therefor for controlling the compound elevating and supporting linkage 26 is not particularly shown because such is clearly within the skill of the art and does not materially relate to the present invention. However, it is noted that hydraulic cylinder 26k is anchored to the main anchor shaft 26f and extends generally upwardly therefrom where the rod end connects to the main beam 26d. Thus, by selectively actuating the hydraulic cylinder 26k, the compound elevating and supporting linkage is raised and lowered accordingly.

Figure 3:
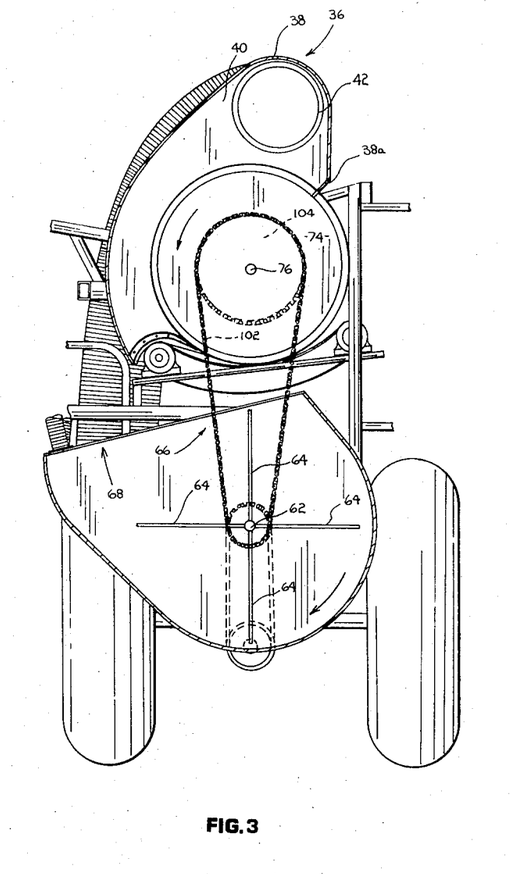
FIG. 3 is a fragmentary sectional view taken through the cylinder and fan unit of the pneumatic tobacco harvester.
Figure 4:
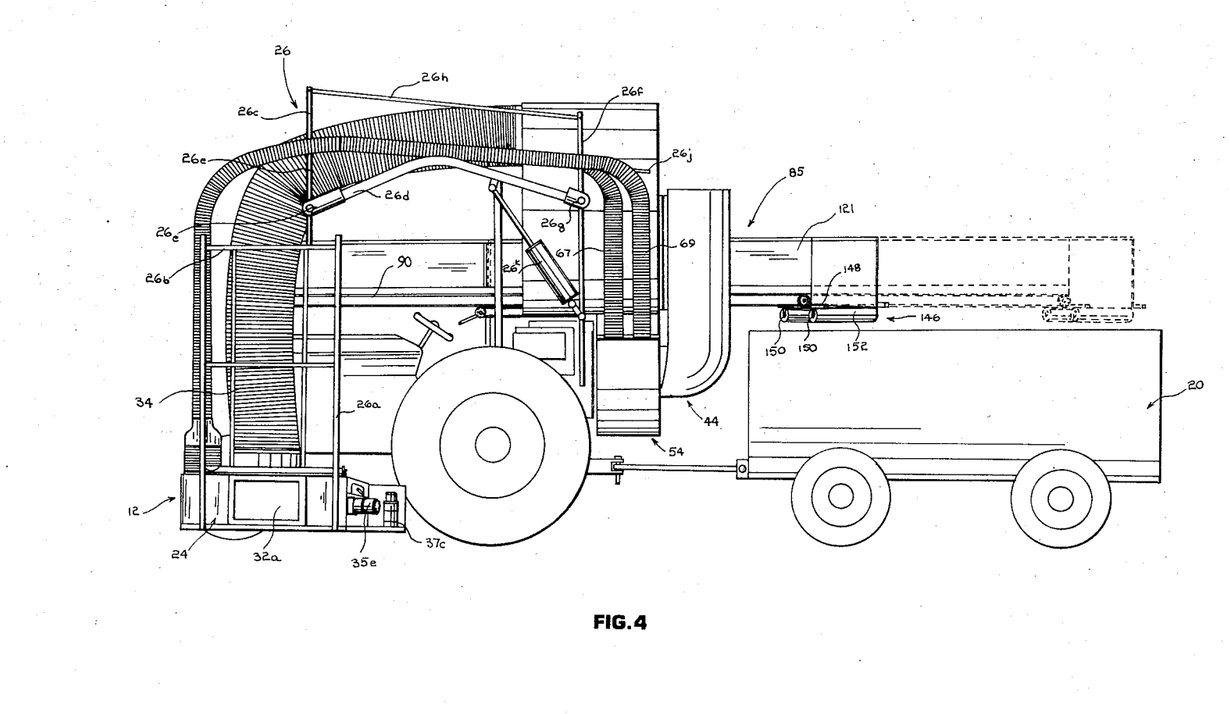
FIG. 4 is a side elevational view of the pneumatic tobacco harvester of the present invention, particularly illustrating a trailing wagon for receiving the tobacco leaves or material from a side conveyor assembly.

Referring now to the pneumatic conveyor system 14, it is seen that this system comprises a flexible tube 34 that is secured at its lower most end to the vertical side opening 32b in the inner housing 22 of the defoliating unit. From the defoliating unit 12, the flexible tube 34 leads therefrom and connects to a leaf separating chamber, indicated generally at 36, which is mounted to a basic mounting frame structure 13 carried by the tractor 11. Viewing the leaf separating chamber 36 in greater detail, it will be observed that the chamber is comprised of an outer wall 38 which, as best seen in FIG. 3, curves generally upwardly over the upper level of the flexible tube 34 where a portion thereof extends downwardly therefrom where a side edge 38a terminates. The leaf separating chamber 36 is further provided with a pair of side walls 40, each side wall being disposed on a respective side of the outer wall 38 and depending generally downwardly therefrom such that the combined fabrication of the outer wall 38 and the side walls 40 form a semi-enclosed chamber. Front side wall 40 includes an inlet opening 42 for receiving the upper end of the flexible tube 34 extending from the defoliating unit 12.

Figure 1:
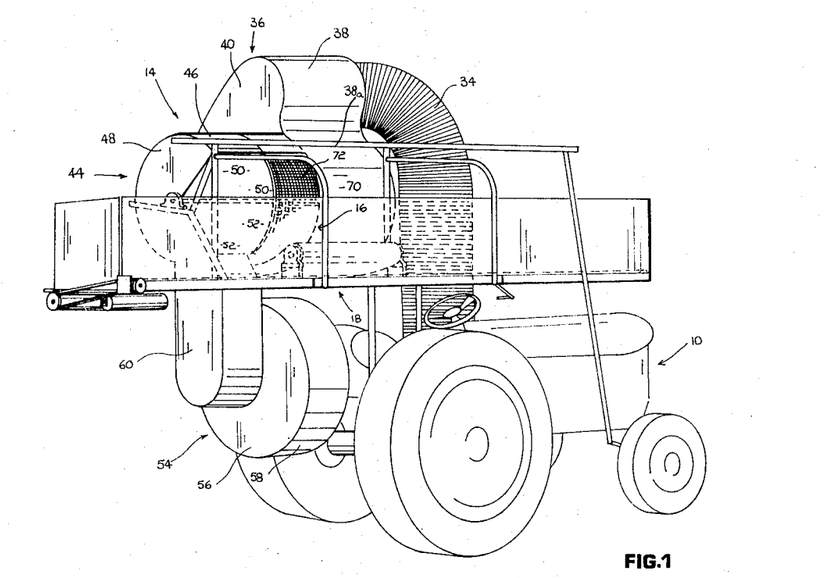
FIG. 1 is a perspective view of the pneumatic tobacco harvester of the present invention.

Disposed generally below the leaf separating chamber 36 is an intermediate air duct system, indicated generally at 44. In particular, the air duct system 44 comprises a semi-circular outerband 46, as best seen in FIG. 1. A rear wall 48 is secured to the rear edge of the semi-circular outer band 46 and a pair of radial walls 50 and 52 are secured to both the rear wall 48 and the semi-circular outer band 46 to partially enclose the intermediate air duct system 44. As seen in FIG. 1, the radial walls 50 and 52 project forwardly pass the transverse plane of the front edge of the semi-circular outer band 46. The significance of the forwardly projecting radial walls 50 and 52 will become apparent subsequently in the present disclosure when discussing the leaf separating means 16.

Continuing to refer to the pneumatic conveyor system 14, a fan unit indicated generally at 54 forms a part of the pneumatic conveyor system and is generally disposed below the intermediate air duct system 44. Fan unit 54 comprises a fan housing having a pair of transverse circular walls 56 joined about the outer portions thereof by a circumfential wall 58. The fan unit 54 is communicatively connected for air transfer to the intermediate air duct system 44 by a connecting generally U-shaped air chamber 60 (FIG. 1).

With reference to FIG. 3, the fan unit 54 further includes a generally longitudinally extending propeller shaft 62 rotatively journal therein and including a plurality of axially spaced propeller blades 64 extending radially therefrom where the outer most ends terminate in close proximity to the circumfential wall 58 of the fan unit. The blades 64 are adapted to be driven clockwise, as viewed in FIG. 3, such that air is pulled through an air inlet area 66 of the fan unit and is expelled from the unit through an air outlet area 68.

At this point, it should be pointed out that the exhaust air expelled from the air outlet opening 68 of the fan unit is channeled back to the defoliating unit 12 where the exhaust air is used to separate the upper leaves on the stalks from the leaves entering the defoliating unit 12. To accomplish this a pair of flexible tubes 67 and 69 are operatively attached to the exhaust of the fan unit 54 and extend therefrom, with each tube leading to a respective housing 22 or 24 of the defoliating unit 12. The forward most end of each of the flexible tubes 67 and 69 is preferably bifurcated and adopted to be communicatively connected to cutout 30b and opening 29e of the respective housing.

Figure 2:
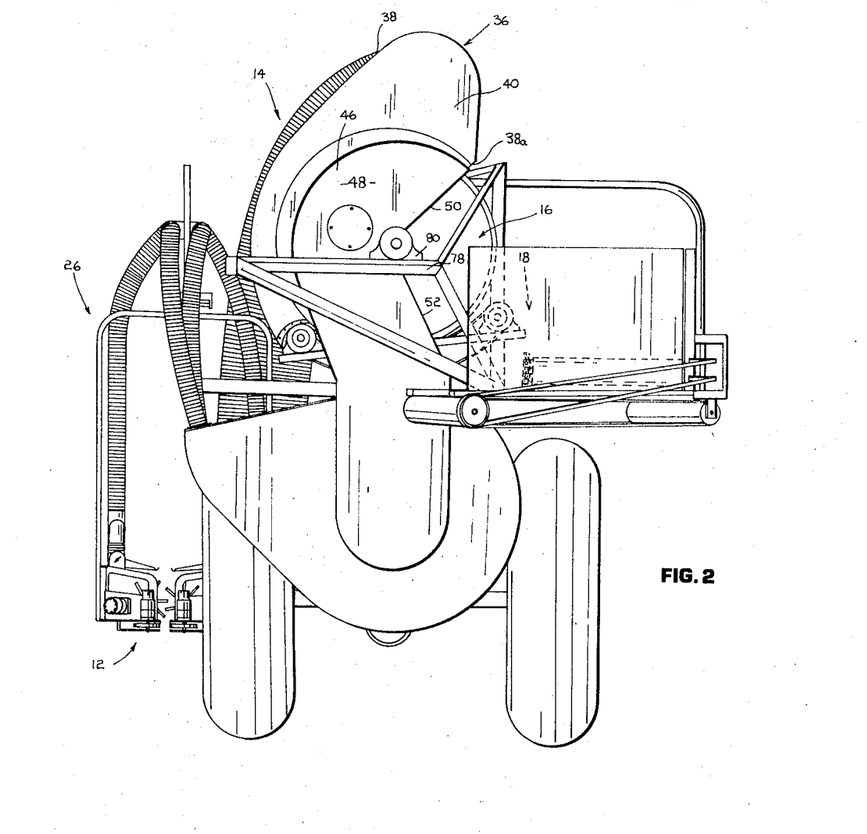
FIG. 2 is a rear elevational view of the pneumatic tobacco harvester of FIG. 1.

As noted herebefore the tobacco leaves or material suspended within the air stream of the pneumatic conveyor system 14 are separated and conveyed therefrom by separating means 16 in the form of a separator-conveyor assembly. The separating means or separator-conveyor assembly 16 comprises a rear opened cylinder 70 which includes a circumfential wall structure having an open screen like portion, denoted by the numeral 72, about the rear area thereof. The front portion of the cylinders 70 is enclosed by a front end wall 74. As illustrated in FIGS. 2 and 3, the cylinder 70 is rotatively mounted on a longitudinally extending cylinder shaft 76, with the shaft being rotatively mounted within bearings 80 supported on the mounting frame structure 13 extending above tractor 11.

The cylinder 70 is positioned relative to the pneumatic conveyor system 14 such that it lies in the path of the tobacco leaves or material being pneumatically conveyed from the defoliating unit 12 towards the fan unit 54. More particularly, the cylinder is placed such that a substantial volume of the air passing from the leaf separating chamber 36 to the intermediate air duct system 44 must pass through the screen like wall 72 thereof. Viewing the structural relationship between the leaf separating chamber 36, the cylinder 70 and the intermediate air duct system 44, it is seen that the outer wall structure of the cylinder 70 lies closely adjacent the lower edges of the side walls 40 of the leaf separating chamber 36. As particularly illustrated in FIG. 3, air entering the leaf separating chamber 36 from the flexible tube 34 is pulled generally downwardly therethrough by the fan unit 56. As the air is pulled generally downwardly through the leaf separating chamber 36, a substantial portion of the air stream is compelled to be pulled through the screen like wall 72 of the cylinder 70. Because the air carries the tobacco leaves or other material, the screen like wall 72 of the cylinder 70 tends to retain or intercept the leaves or material being conveyed in the air stream, allowing the air to continually pass therethrough.

Referring now to FIG. 1, the particular structural relationship between the cylinder 70 and the intermediate air duct system 44 allows the air passing through the screen like wall structure of the cylinder to move therefrom through the intermediate air duct system 44 on down and through the fan unit 54. More particularly, the semicircular outer band 46 is circumfentially aligned with the adjacent cylindrical wall structure of the cylinder 70 and the presence of the radial walls 50 and 52 tends to form a chamber inside of the cylinder 70 which serves as an interconnecting air duct between the leaf separating chamber 36 and the intermediate air duct system 44. Therefore, it can be seen that the wall structure of the cylinder occupies a portion of the cross section of the pneumatic conveyor system 14 and consequently lies in the path of tobacco leaves or other material passing therethrough.

As will be further discussed, the cylinder 70 is disposed such that a portion thereof, i.e., that portion measured clockwise between the 1:00 o'clock and 5:00 O'clock positions, lies outside of the pneumatic conveyor system 14. It will be appreciated that in order to efficiently maintain a vacuum within the other portion of the cylinder 70 lying within the pneumatic conveyor system, i.e., that portion measured clockwise between the 5:00 o'clock and 1:00 o'clock positions various air seals should be provided between adjacent structure of the cylinder 70 and the leaf separating chamber 36 and the intermediate air duct system 44. Such air seals are shown in the drawings of the present disclosure and denoted by numeral 43.

As the leaves or other material involved is conveyed from the defoliationg unit 12 into the leaf separating chamber 36, it follows according to the above discussion that the leaves or material are retained by the screen like wall 72 of the cylinder 70. Because the cylinder 70 is driven counterclockwise as viewed in FIGS. 2 and 3, the tobacco leaves or other material is retained the outer wall structure thereof until the leaves reach approximately the 5:00 o'clock position. As seen in the drawings, once the leaves reach the 5:00 o'clock position, they are about to leave the area where the vacuum is being pulled and the air is being drawn through the cylinder 70. Therefore, once the leaves retained by the screen like wall 72 of the cylinder 70 pass from the vacuum area at the 5:00 o'clock position, they are then free to fall from the outer wall 72 of the cylinder under the influence of gravity.

To catch the leaves falling from the cylinder 70 outside of the vacuum area created by the pneumatic conveyor system 14, the present invention includes conveying means 18 for conveying the leaves or other material from the cylinder or leaf separator conveyor to a bulk storage accumulating facility which in the present case is a wagon 20 pulled by tractor 11. With reference to the conveying means 18, it will be seen that a transverse leaf conveyor is disposed generally below the cylinder 70 and in close proximity to the lower portions thereof. The transverse leaf conveyor comprises an endless flexible conveyor belt 82 that is trained around two laterally spaced rotatively mounted rollers 84 that are suitably journal for rotation and supported by the mounting frame structure 13 extending from the tractor 11. Thus, in light of the above discussion and in view of the harvester as viewed in FIGS. 2 and 3, it is seen that the tobacco leaves or other material being conveyed is received by the conveyor belt 82 as the leaves or material fall off from the outer side of the cylindrical wall structure of the cylinder 70 upon passing outside of the vacuum created by the pneumatic conveyor system 14.

Disposed adjacent the transverse leaf conveyor 82 and extending generally perpendicular thereto is a longitudinal extending conveyor system, indicated generally at 85. The longitudinal conveyor system 85 basically comprises a pair of channel shaped guide rails 120 which are supported from the mounting frame structure 13 extending from tractor 11. Guide rails 120 are disposed in parallel relationship and extend fore-and-aftly along side of the harvester and are particularly adapted to receive a main conveyor frame assembly 122 therein. It, therefore, follows that the main conveyor frame assembly 122 is slideably confined within the guide rails and operative to move fore-and-aft therein.

Figure 5:
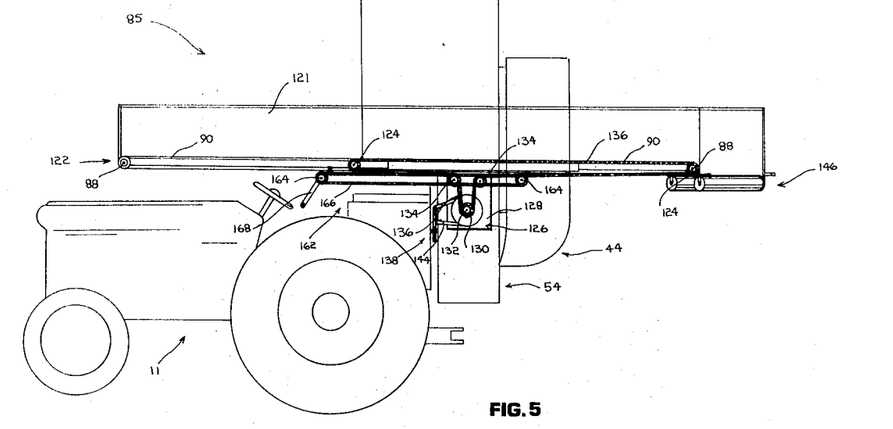
FIG. 5 is a fragmentary side elevational view of the pneumatic harvester illustrating the side conveyor assembly and drives therefor.
Figure 6:
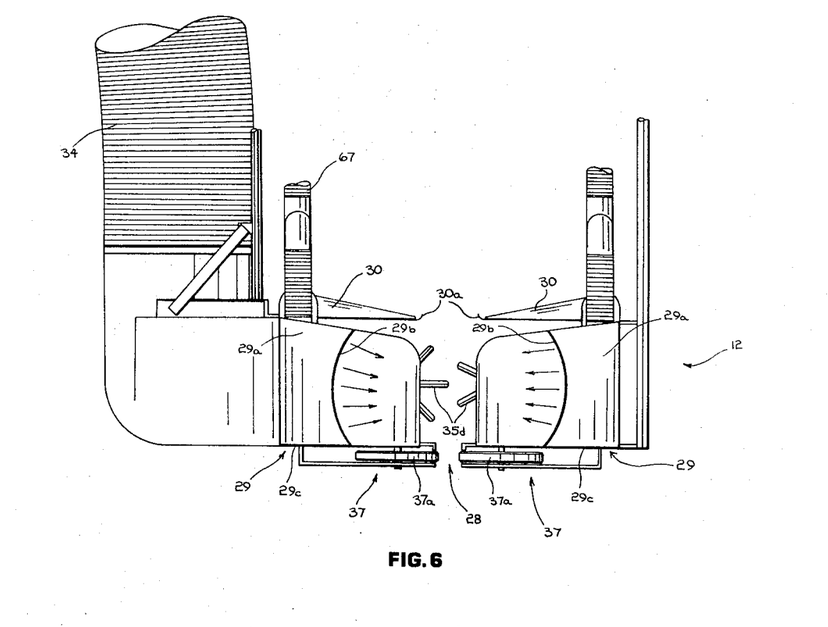
FIG. 6 is a front elevational view of the defoliating unit of the pneumatic tobacco harvester.
Figure 7:
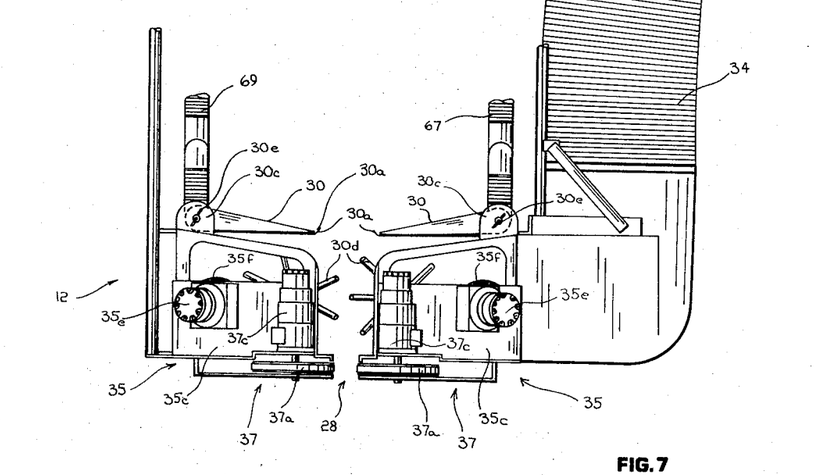
FIG. 7 is a rear elevational view of the defoliating unit.
Figure 8:
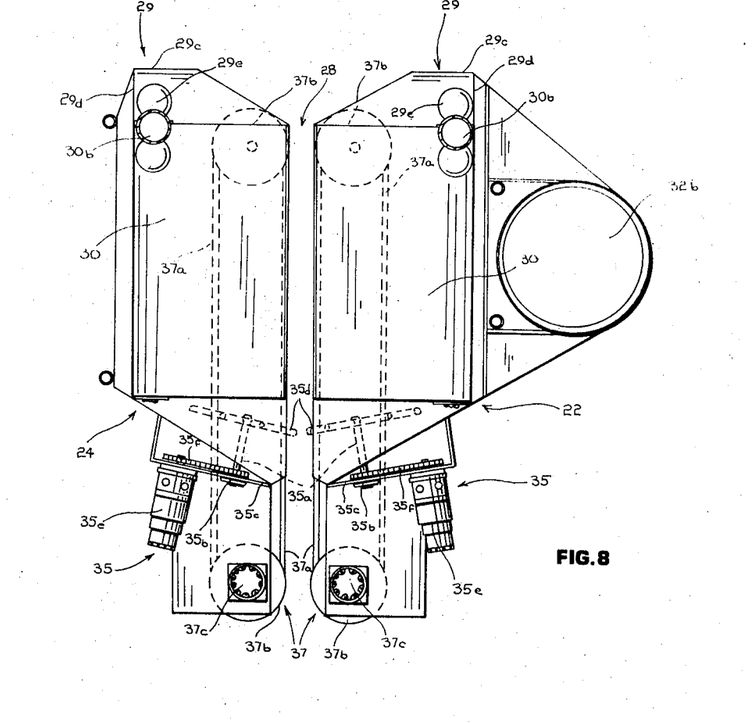
FIG. 8 is a top plan view of the defoliating unit.
Figure 9:
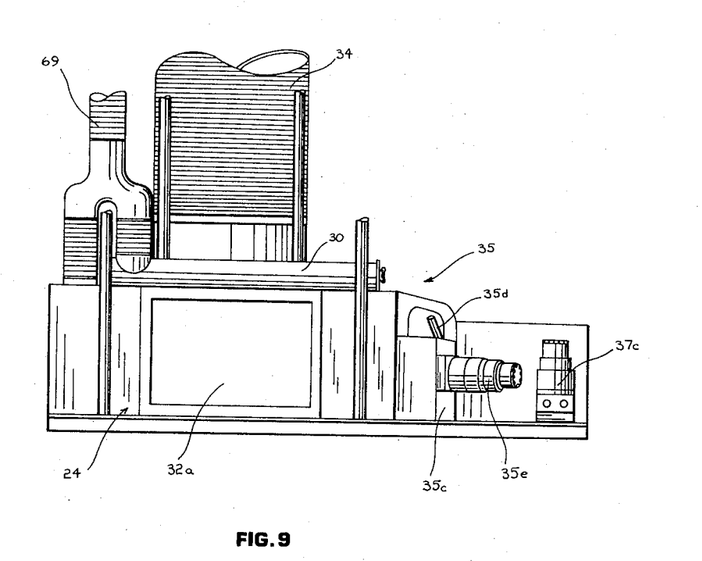
FIG. 9 is a side elevational view of the defoliating unit.

As particularly seen in FIG. 5, the main conveyor frame assembly 122 includes a pair of longitudinally spaced, rotatively mounted rollers as disposed therein. Trained around the rollers 88 is an endless flexible conveyor belt 90 which is operative to receive tobacco leaves or material from the transverse conveyor belt 82. Main conveyor frame assembly 122 is further provided with a pair of belt drive sprockets 124, the rear most drive sprocket being fixedly secured to the rear most roller 88 for driving the same and consequently driving the total conveyor system 85. In addition, conveyor frame 122 is provided about the outer side thereof with a retaining wall 121.

In order to drive the longitudinal conveyor system 85 from the power take-off of the tractor 11, stationary drive assembly 126 is disposed on the frame mounting structure 13 just inwardly of the conveyor system 85. The stationary drive assembly 126 comprises a mounting plate 128 supported by the above mentioned mounting frame structure 13, a drive pulley 130 rotatively mounted to said mounting plate, and a pair of idler sprockets 134 also rotatively mounted to the plate 128 just above drive pulley 130. Mounted in co-axial relationship with the drive pulley 130 and fixed to rotate therewith is a drive sprocket 132. A drive chain 136 is trained around the drive sprocket 132 and winds around the inside of idlers 134 and from the idlers extends on around sprockets 124 for driving the conveyor belt 90.

To drive sprocket 132 and consequently the conveyor belt 90, a right angle mule drive 138 is provided for transferring driving torque to the drive sprocket 132. Mule drive 138 includes a drive sheave (not particularly shown) which is operatively driven from the power take-off of the tractor 11 and has trained therearound a drive belt 144 which is trained around a pair of intermediate idlers (not shown). Belt 144 is further trained around pulley or sheave 130 for transferring torque thereto.

Disposed about the rear of the longitudinal conveyor system 85 is a final conveyor, indicated generally at 146, which receives tobacco leaves or material from conveyor belt 90 and directs the same inwardly therefrom where the leaves or material falls into the trailing wagon 20. The final conveyor 146 includes a conveyor frame 148 which is fixed to and extends from the main conveyor frame assembly 122. Rotatively mounted in opposite end portions of the conveyor frame 148 is a pair of rollers 150 that have a flexible conveyor belt 152 trained there around.

The rearmost roller 150 of the final conveyor 146 is driven by another mule type drive 154. In particular, this drive includes a drive pulley (not shown) fixed to and rotatable with the rearmost roller 150 and driven by a drive belt 161 which is trained around a drive pulley 156 and a pair of idlers 158. It follows that the rearmost roller 88 of the main conveyor frame assembly 122 serves to drive the drive pulley 156 and consequently the final conveyor belt 152.

As previously pointed out, the bulk storage facility of the present disclosure comprises a wagon 20 that is pulled behind the tractor 11 during the harvesting operation. As seen in the drawings, the final conveyor 146 of the longitudinal conveyor system 85 is generally disposed over the wagon such that the tobacco leaves or material being conveyed is allowed to fall into the wagon 20. To uniformly fill the wagon 20, the longitudinal conveyor system 85 is provided with a drive system for moving the entire main conveyor frame assembly 122 fore-and-aft within the guide rails 120 such that the wagon may be filled continuously from front to rear. The drive assembly, indicated generally at 162, for the longitudinal conveyor system comprises a pair of drive sprockets 164 which are supported in a suitable frame by the mounting frame structure 13 of the tractor 11. It is, therefore, appreciated that the sprockets 164 and the conveyor frame drive 162 remain stationary relative to the tractor 11. Trained around the sprockets 164 is a drive chain 162 which is fixed by a bolt or other suitable means directly to the main conveyor frame assembly 122. To drive the sprockets 164 and consequently move the entire conveyor frame assembly 122 fore-and-aft, there is provided a crank arm 168 which is disposed closely adjacent the operator's station on the tractor where it may be manually actuated.

During the normal operation of the longitudinal conveyor system 85, the drive pulley 130 is generally driven clockwise, as viewed in FIG. 5. Thus it is seen that the top strand of the conveyor belt 90 moves from front to rear, carrying the leaves of tobacco or other material to the final conveyor 146. Also, it is seen that the top strand of the drive chain 126 likewise moves from front to rear. The relationship between the stationary drive assembly 126 and the drive sprockets 124 on the main conveyor frame assembly 122 establishes a "mechanical advantage" that tends to pull the entire conveyor frame assembly 122 towards the rear. Therefore, this mechanical advantage will assist the operator in manually moving the entire conveyor assembly from front to rear during the harvesting operation which, as pointed out above, results in the tobacco leaves or other material carried thereby being deposited over the total area of the wagon 20, and consequently serving to uniformly load the same. Once the conveyor frame assembly 122 has been extended to its rearmost position, the operator may turn the crank 168 counterclockwise, as viewed in FIG. 5, and consequently bring the conveyor frame assembly 122 back to its forwardmost position.

The basic drive for the fan unit 54 and the cylinder 70 is provided from the tractor power take-off shaft 92 that conventionally extends rearwardly from the tractor 11. Power take-off shaft 92 includes a pulley 94 (or series of pulleys) that drive a pulley 98 (or series of pulleys) aligned therewith and fixed to the propeller shaft 62 by a conventional v-belt driving arrangement 96. The torque transferred to the propeller shaft 62 is transferred again to the cylinder shaft 76 by a chain drive that comprises a drive sprocket (not shown but forwardly of pulley 96) that is fixed to the propeller shaft, a cylinder sprocket 104 fixed to the cylinder shaft 76, and a chain 102 trained around both last mentioned sprockets and operative to transfer the torque from the propeller shaft 62 to the cylinder 70. Although torque for driving the side conveyor 90 may be taken from any number of appropriate location in the drive system, especially between the power take-off shaft 92 and the cylinder shaft 76, it is seen that the drive pulley 140 of mule drive 138 may be fixed to the propeller shaft 62, and hence provide the necessary driving torque for the total longitudinal conveyor system 85.

Briefly reviewing the tobacco harvester of the present invention, it will be appreciated that as the harvester 10 moves through a tobacco field that the defoliating unit is disposed such that the row of stalks being harvested passes between the inner and outer housings 22 and 24. As successive stalks pass through the defoliating unit 12, the leaves projecting from the stalks about the priming level encompassed by the defoliating unit are defoliated from the stalks by the previously described pneumatic and mechanical defoliating systems. The defoliated leaves are then transferred from the defoliating unit by the pneumatic conveyor system 14.

Upon being transferred from the defoliating unit 12, the defoliated leaves pass therefrom through the flexible tube 34 and are, as described hereinbefore, suspended in an air stream during the conveying process. From the flexible tube 34, the leaves are emptied into the leaf separating chamber 36 and from there move generally downwardly where they are retained by the rotatively driven cylinder 70. As noted before, the air stream of the pneumatic conveyor system 14 is allowed to pass through the cylinder 70 while the same cylinder functions to intercept and retain the individual leaves or material carried by the air stream.

As particularly viewed in FIG. 3, the cylinder is driven counterclockwise such that the retained leaves on the outer circumfential wall structure thereof tends to remain against the outer wall structure as long as that portion of the cylindrical wall structure is disposed within the pneumatic conveyor system 14. As the leaves upon the outersurface of the cylindrical wall 72 reach approximately 5:00 o'clock position, as seen in FIG. 3, they escape the vacuum of the pneumatic conveyor system 14 and consequently free fall under the influence of gravity from the cylinder 70.

As the leaves fall from the cylinder 70, they are received by the transverse leaf conveyor 82 and conveyed therefrom to conveyor belt 90 where the leaves are continually conveyed to an accumulating bulk storage wagon 20.

From the above, it obviously follows the tobacco harvester of the present invention provides a new concept and system for conveying defoliated leaves from a defoliating unit to a bulk storage facility or the like. Unlike the conventional belt and roller conveyors of the prior art, the present conveying system is relatively free of physical contact with the leaves during the actual conveying operation, and consequently does not bruise and break the leaves as was common with such prior art devices.

The terms "upper," "lower," "forward," "rearward," etc., have been used herein merely for the convenience of the foregoing specification and in the appended claims to describe the Pneumatic Tobacco Harvester and its parts as oriented in the drawings. It is to be understood, however, that these terms are in no way limiting to the invention since the Pneumatic Tobacco Harvester may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A pneumatic tobacco harvester of the type adapted to defoliate leaves from successive stalks of a row and operative to convey said defoliated leaves into a bulk storage facility, said pneumatic tobacco harvester comprising: a mobile frame structure; a tobacco leaf defoliating unit associated with said harvester and normally disposed adjacent the row being harvested for defoliating leaves from the individual stalks of the row, said tobacco leaf defoliating unit including means for engaging and breaking selected leaves from respective stalks passing through said defoliating unit; a pneumatic tobacco leaf conveyor system means operatively associated with said defoliating unit for receiving the defoliated tobacco leaves and conveying the received leaves therefrom; separating means associated with said pneumatic conveyor system for separating the tobacco leaves therefrom, said separating means including a leaf conveyor assembly partially disposed within said pneumatic conveyor system and including openings therein whereby air moving within said pneumatic conveyor system may pass therethrough while tobacco leaves moving within said pneumatic conveyor system between said defoliating unit and said leaf conveyor assembly are retained by said leaf conveyor assembly, said leaf conveyor assembly comprising a rotatively mounted cylinder having an outer screen like wall structure, said cylinder disposed relative to said pneumatic conveyor system such that a portion thereof extends substantially through a cross section of said pneumatic conveyor system, whereby tobacco leaves moving within said penumatic conveyor system are retained about the outer screen like wall structure passing through the pneumatic conveyor system; means for conveying the leaves from said separating means; and a receiving facility generally disposed adjacent said conveying means for receiving the tobacco leaves therefrom.

2. The pneumatic tobacco harvester of claim 1 including means associated with said pneumatic conveyor system for directing the exhaust air thereof back to said defoliating unit for orienting the leaves of the individual stalks prior to defoliation.

3. The pneumatic tobacco harvester of claim 1 wherein said tobacco leaf pneumatic conveyor system means includes a fan unit having inlet and outlet openings, whereby air is pulled through said pneumatic conveyor system, through said inlet opening into said fan unit, and exits from said outlet opening of said fan unit.

4. The pneumatic tobacco harvester of claim 3 including means for directing the exhaust air exiting from the outlet opening of said fan unit back to said defoliating unit for using the exhaust air to orient the leaves of each tobacco stalk prior to defoliation.

5. The pneumatic tobacco harvester of claim 1 wherein said conveying means for conveying tobacco leaves from said separating means to said receiving facility includes a movable conveyor assembly movable relative to said receiving facility for uniformly loading the same.

6. The pneumatic tobacco harvester of claim 1 including means associated with said pneumatic conveyor system for separating the upper leaves of the tobacco stalks from the leaves passing through the defoliating unit.

7. The pneumatic tobacco harvester of claim 1 wherein said conveying means for conveying the tobacco leaves from said separating means to said bulk storage facility comprises a conveyor belt disposed generally adjacent the portion of said cylindrical wall structure lying exteriorly of said pneumatic conveyor system whereby tobacco leaves being retained against the outer screen like wall structure of the cylinder may be released therefrom upon moving outside of said pneumatic conveyor system such that the released leaves may be conveyed by said conveyor belt.

8. The pneumatic tobacco harvester of claim 7 wherein said conveying means for conveying the tobacco leaves between said separating means and said bulk storage facility comprises a second belt conveyor oriented generally perpendicular to said first conveyor belt and disposed adjacent thereto for receiving leaves therefrom whereby the received tobacco leaves are transferred directly into said bulk storage facility.

9. The tobacco harvester of claim 1 including a cooperative pneumatic and mechanical defoliating unit for defoliating leaves from a tobacco stalk comprising: a row inlet area for receiving successive tobacco stalks; means for providing a pneumatic system of air about said defoliating unit for orienting the tobacco leaves passing therethrough; and a mechanical defoliating system for defoliating the leaves oriented by said pneumatic air system, said mechanical defoliating system including means for engaging and breaking selected leaves from respective stalks passing through said defoliating unit.

10. The cooperative pneumatic and mechanical defoliating unit of claim 9 including a pair of semi-enclosed housings, each disposed about a respective side of the row inlet area and including openings to accommodate the flow of air associated with said pneumatic air system.

11. The cooperative pneumatic and mechanical defoliating unit of claim 10 wherein said mechanical defoliating system is spaced rearwardly of the effective area of said pneumatic air system such that the mechanical defoliating system is only operative subsequent to the orientation of the leaves by the pneumatic air system.

12. The cooperative pneumatic and mechanical defoliating unit of claim 9 wherein said pneumatic air system includes means for separating the leaves disposed about a particular area of each stalk from the leaves to be defoliated by the defoliating unit.

13. The cooperative pneumatic and mechanical defoliating unit of claim 12 wherein said means for separating the leaves of the stalk includes a divider panel disposed on each side of the row inlet area and including an air duct area therein adapted to direct air there through up against the underside of the leaves of the tobacco stalks disposed above the defoliating level.

14. The cooperative pneumatic and mechanical defoliating unit of claim 13 wherein said divider panel is of a general U-shape with an open side thereof being disposed adjacent the stalks passing through said row inlet area, and wherein the lower outer edge of each U-shaped divider panel is provided with a generally upturned lip for directing air passing there through generally upwardly against the overpassing tobacco leaves.

15. A material handling apparatus comprising: a mobile frame structure; a header unit extending from said mobile frame structure and adapted to receive materials; a pneumatic conveyor system operatively associated with said header unit for pneumatically conveying the received material therefrom; a driven material separator conveyor assembly partially disposed within said pneumatic conveyor system for intercepting the material passing therethrough and separating said material from said pneumatic conveyor system and transferring the intercepted separated material therefrom, said material separator conveyor assembly including a rotatively mounted cylinder having an outer wall structure with openings therein, said cylinder being disposed such that a portion thereof is continuously disposed interiorly of said pneumatic conveyor system, whereby during operation as said cylinder is rotatively driven air passes through the openings within the wall structure thereof while the material being carried thereby is intercepted by said wall structure and conveyed from the pneumatic conveyor system by the rotating cylinder; means for conveying the separated material from said material separator conveyor assembly; and a receiving means generally disposed adjacent said conveying means for receiving the material conveyed from said material separator conveyor assembly.

16. The material handling apparatus of claim 12 wherein said pneumatic conveyor system comprises: a fan unit disposed adjacent said cylinder and including air inlet and outlet openings therein; and intermediate air duct system extending between the air inlet of said fan unit and the inner cylindrical wall structure of said cylinder; a separator air duct chamber housing a substantial portion of the outer wall structure of said cylinder and communicatively connected with the intermediate air duct system disposed adjacent the inner cylindrical wall structure of the cylinder, wherey air may conveniently be directed from said cylinder chamber through the openings in said cylinder wall and on into said intermediate air duct system; and a connecting air duct system interconnected between said cylinder chamber and said header unit for conveying the material received by said header unit to said cylinder chamber.

17. The material handling apparatus of claim 16 wherein said conveying means for conveying material from said material separator-conveyor assembly to said bulk storage facility includes a first conveyor disposed adjacent an outer circumferential portion of said cylinder wall structure of said pneumatic conveyor system for receiving the material separated and conveyed from said pneumatic conveyor system.

* * * * *